No. 683,435. Patented Oct. 1, 1901.
A. W. BURWELL.
PROCESS OF MAKING COMPOUNDS FOR USE IN TINNING BATHS.
(Application filed Jan. 10, 1901.)
(No Model.)
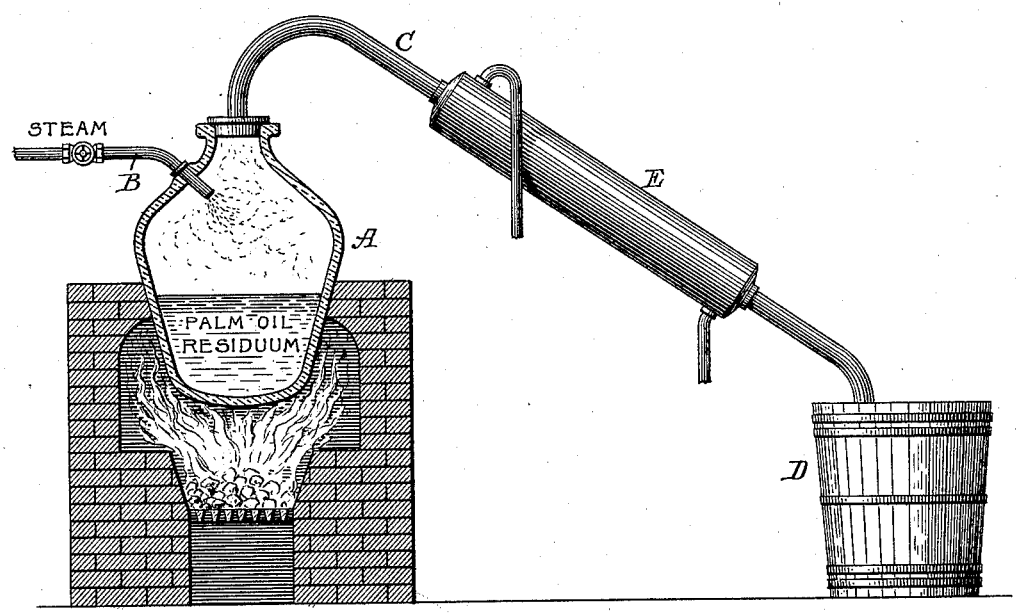

UNITED STATES PATENT OFFICE.

ARTHUR W. BURWELL, OF CLEVELAND, OHIO.

PROCESS OF MAKING COMPOUNDS FOR USE IN TINNING-BATHS.

SPECIFICATION forming part of Letters Patent No. 683,435, dated October 1, 1901.

Application filed January 10, 1901. Serial No. 42,768. (No specimens.)

*To all whom it may concern:*

Be it known that I, ARTHUR W. BURWELL, a citizen of the United States, residing at Cleveland, in the county of Cuyahoga and State of Ohio, have invented new and useful Improvements in Processes of Manufacturing a Compound for Tinning-Baths from the Spent Palm-Oil Residuum from Such Baths, of which the following is a specification.

It is well known that with all modern tinning-machines a "setting-oil" is employed on the delivery side of the machine, consisting of palm-oil. This oil is found to contain, among other things, free oleic acid and oleic glycerids. It is the former that acts as a flux and performs the functions required in the tinning process, leaving a residuum amounting to fully fifty per cent. of the original mass. This residuum, which is a wax-like solid at ordinary temperatures, is practically waste, as there is very little use for it and practically no demand for it whatever, and it is therefore usually buried. To illustrate how thoroughly destroyed the spent residuum is for the tin-maker's purpose, it need only be stated that after a certain point has been reached in the use of the setting-oil the residuum is found to be a positive menace to the process, rendering the tin plates gummy and sticky and spotting them with carbonaceous deposits. The tin-baths are usually cleaned from once to twice a week and the spent residuum removed.

My invention relates to a method or process whereby a large percentage (about seventy-two per cent.) of the waste product may be reclaimed and reused in a tinning-bath with results equal or superior to the results obtained from the use of the original palm-oil.

My process consists in decomposing the residuum by heat and steam within a closed vessel or still, driving off the volatile portions, catching and condensing same, and mixing the condensed portions with a high fire-test mineral oil.

Any suitable apparatus may be employed—such, for instance, as illustrated in the accompanying drawing, wherein is shown a common form of still A, into which a steam-pipe B discharges for separating and driving off the volatile products, which pass through a tube or pipe C to a receptacle D. The tube C is provided with a cold-water cylinder or jacket E for condensing the products, all of which will be readily understood. Before the residuum is put into the still it is first heated, and after it has become thoroughly melted it is vigorously stirred to free it from moisture, which I find causes effervescence in the still while the mass is being heated to drive off the volatile portions. The mass is then transferred to the closed vessel or still and heated to a high temperature, and while being so heated steam is injected into the still to separate and drive off the volatile portions, which are caught and condensed and then heated together with a high fire-test mineral oil having a flash of about 450° Fahrenheit or above and a specific gravity of about 30° Baumé or less. The volatile portions may be caught and condensed and allowed to settle in vats or other suitable receptacles, where the ingredients will be separated by gravity and the free acid or oil drawn off and it alone mixed and heated together with the mineral stock, or all of the volatile portions may be carried directly from the still to the mineral stock and all of it mechanically mixed therewith, utilizing the heat of the former to aid in the mixing, as I have found that while the free oleic acid is the necessary ingredient of a setting-oil the other volatile products from the residuum do not injuriously affect the qualities of the mixture. When all of the vapors or volatile portions are carried directly from the still to the mineral stock, the process should be carried on until the resultant mass is about one-third more than the original volume of the mineral stock, or until the mixture contains about thirty per cent. of the volatile products to about seventy per cent. of the mineral stock. The resultant product will be found to possess the requisite qualities for a highly-efficient setting-oil.

When the free acid or oil constituent is first separated from the other volatile portions from the still and such acid or oil alone used, about twenty-five per cent. of the latter heated and mixed with the mineral stock will be found to be an equally satisfactory mixture for the purposes intended.

Having thus described my invention, what I claim as new, and desire to secure by Letters Patent, is—

1. The process of manufacturing a compound for use in tinning-baths from the waste residuum of palm-oil used in such baths, the same consisting in decomposing the residuum by heat and steam within a closed vessel, driving off the volatile portions, catching and condensing same, and mixing the condensed portions with a high fire-test mineral oil in about the proportions specified.

2. The process of manufacturing a compound for use in tinning-baths from the waste residuum of palm-oil used in such baths, the same consisting in decomposing the residuum by heat and steam within a closed vessel, driving off the volatile portions, catching and condensing same, separating out the free acid constituent, and mixing this constituent with a high fire-test mineral oil.

3. The process of manufacturing a compound for use in tinning-baths from the waste residuum of palm-oil used in such baths, the same consisting in decomposing the residuum by heat and steam within a closed vessel, driving off the volatile portions, catching and condensing same, and leading the portions so condensed into a high fire-test mineral oil until the latter has been increased to about one-third more than its original volume.

In testimony whereof I have hereunto set my hand in presence of two subscribing witnesses.

ARTHUR W. BURWELL.

Witnesses:
FRANK W. NESBITT,
W. J. LYLE.